(12) United States Patent
Fukazu et al.

(10) Patent No.: US 10,033,324 B2
(45) Date of Patent: Jul. 24, 2018

(54) VEHICLE

(71) Applicant: HONDA MOTOR CO., LTD., Tokyo (JP)

(72) Inventors: Tomohiro Fukazu, Wako (JP); Noboru Fujiyoshi, Wako (JP); Kosuke Oguri, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/426,976

(22) Filed: Feb. 7, 2017

(65) Prior Publication Data

US 2017/0237379 A1 Aug. 17, 2017

(30) Foreign Application Priority Data

Feb. 12, 2016 (JP) .................................. 2016-024980

(51) Int. Cl.
*H02P 27/04* (2016.01)
*H02P 27/06* (2006.01)
(Continued)

(52) U.S. Cl.
CPC .............. *H02P 27/06* (2013.01); *B60L 3/003* (2013.01); *B60L 11/12* (2013.01); *B60L 15/007* (2013.01); *B60L 15/02* (2013.01); *B60L 15/32* (2013.01); *H01B 7/0045* (2013.01); *H02G 3/30* (2013.01); *B60L 2240/526* (2013.01); *B60L 2260/28* (2013.01); *Y02T 10/645* (2013.01); *Y02T 10/648* (2013.01); *Y02T 10/7077* (2013.01)

(58) Field of Classification Search
CPC .... H02P 1/00; H02P 3/00; H02P 27/04; H02P 27/06; H02P 6/00; H02P 23/00; H02P 25/00
USPC ...... 318/3, 139, 400.01, 700, 725, 726, 727, 318/800, 801; 180/233, 252, 53.1, 53.5, 180/54.1, 65.1, 65.21, 65.22, 65.29, 65.51
See application file for complete search history.

(56) References Cited

U.S. PATENT DOCUMENTS 7,659,651 B2 * 2/2010 Obata ................... B60L 11/123
310/180
7,764,042 B2 * 7/2010 Obata ..................... B60L 11/08
318/800

(Continued)

FOREIGN PATENT DOCUMENTS

JP 2004-148850 5/2004
JP 2011-068187 4/2011

*Primary Examiner* — Antony M Paul
(74) *Attorney, Agent, or Firm* — Mori & Ward, LLP

(57) ABSTRACT

A vehicle includes a first and second motors, a high-voltage device, and a power converter. The power converter is disposed between the first and second motors. The power converter is configured to convert the electric power and to supply the converted electric power to the first and second motors. The power converter has a substantially rectangular parallelepiped shape that has a first side wall, a second side wall opposite to the first side wall, a third side wall, and a fourth side wall opposite to the third side wall. The first connector is provided on the first side wall and is connected to a first three-phase line via which the first motor is electrically connected to the power converter. The second connector is provided on the third side wall and is connected to a second three-phase line via which the second motor is electrically connected to the power converter.

15 Claims, 8 Drawing Sheets

(51) Int. Cl.
    *B60L 15/02*     (2006.01)
    *B60L 15/32*     (2006.01)
    *H01B 7/00*     (2006.01)
    *H02G 3/30*     (2006.01)
    *B60L 3/00*     (2006.01)
    *B60L 11/12*     (2006.01)
    *B60L 15/00*     (2006.01)

(56) References Cited

U.S. PATENT DOCUMENTS

| | | | |
|---|---|---|---|
| 8,390,163 B2 * | 3/2013 | Saito | B60K 6/448 310/156.53 |
| 8,948,943 B2 * | 2/2015 | Takagi | B60W 10/08 180/65.21 |

* cited by examiner

VEHICLE

CROSS-REFERENCE TO RELATED APPLICATIONS

The present application claims priority under 35 U.S.C. § 119 to Japanese Patent Application No. 2016-024980, filed Feb. 12, 2016, entitled "Vehicle." The contents of this application are incorporated herein by reference in their entirety.

BACKGROUND

Technical Field

The present invention relates to a vehicle.

Discussion of the Background

Vehicles such as hybrid vehicles and electric vehicles, which use motor power for propulsion, generally include a high-voltage device (for example, a high-voltage battery) that supplies electric power to a motor and a power converter (for example, an inverter) that performs electric power conversion when the electric power of the high-voltage device is supplied to the motor. Japanese Unexamined Patent Application Publication No. 2011-68187, for example, describes a hybrid vehicle including a motor and a power converter, which are disposed in a front section of the vehicle, and a high-voltage device, which is disposed in a rear section of the vehicle. Japanese Unexamined Patent Application Publication No. 2004-148850 describes a hybrid vehicle including a motor, which is disposed in a front section of the vehicle, and a high-voltage device and a power converter, which are disposed in a rear section of the vehicle.

SUMMARY

According to one aspect of the present invention, a vehicle includes a first motor, a second motor, a high-voltage device, and a power converter. The first motor and the second motor are apart from each other in a front-rear direction. The high-voltage device supplies electric power to the first motor and the second motor. The power converter performs electric power conversion when the electric power of the high-voltage device is supplied to the first motor and the second motor. The power converter is disposed between the first motor and the second motor in the front-rear direction. The power converter has a rectangular parallelepiped shape that extends in a left-right direction. The power converter is provided with a first connector portion on a side surface at one side in the front-rear direction and a second connector portion on a side surface at one side in the left-right direction. The first connector portion is connected to a three-phase line that electrically connects the first motor to the power converter. The second connector portion is connected to a three-phase line that electrically connects the second motor to the power converter.

According to another aspect of the present invention, a vehicle includes a first motor, a second motor, a high-voltage device, and a power converter. The first motor and the second motor are arranged along a front-rear direction of the vehicle. The front-rear direction is perpendicular to a height direction of the vehicle. The high-voltage device supplies electric power. The power converter is disposed between the first motor and the second motor in the front-rear direction. The power converter is connected to the high-voltage device, the first motor, and the second motor. The power converter is configured to convert the electric power supplied from the high-voltage device and to supply the converted electric power to the first motor and the second motor. The power converter has a substantially rectangular parallelepiped shape that has a longest side along a width direction of the vehicle perpendicular to the front-rear direction and to the height direction. The substantially rectangular parallelepiped shape has a first side wall, a second side wall opposite to the first side wall in the front-rear direction, a third side wall, and a fourth side wall opposite to the third side wall in the width direction. The power converter includes a first connector and a second connector. The first connector is provided on the first side wall and is connected to a first three-phase line via which the first motor is electrically connected to the power converter. The second connector is provided on the third side wall and is connected to a second three-phase line via which the second motor is electrically connected to the power converter.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
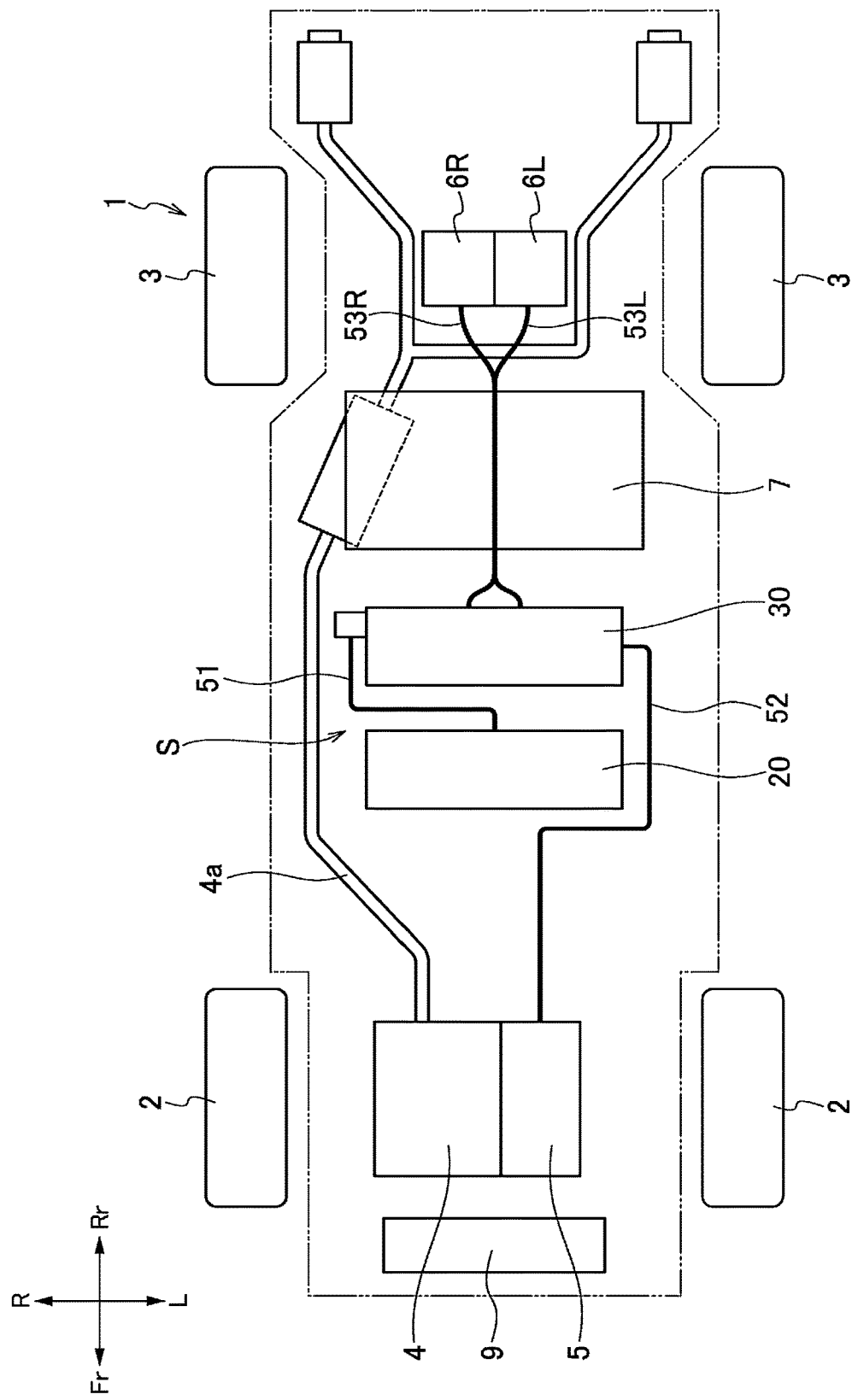
FIG. 1 is a schematic plan view illustrating the arrangement of main components of a vehicle according to an embodiment of the present disclosure.

The embodiments will now be described with reference to the accompanying drawings, wherein like reference numerals designate corresponding or identical elements throughout the various drawings.

Vehicle

A vehicle according to an embodiment of the present disclosure will be described with reference to the drawings. The drawings are to be viewed in the orientation of the reference numerals. In the following description, the front-rear, left-right, and up-down directions are the directions as viewed from the driver. In the drawings, the front, rear, left, right, up, and down sides of the vehicle are respectively denoted by Fr, Rr, L, R, U, and D.

Figure 2:
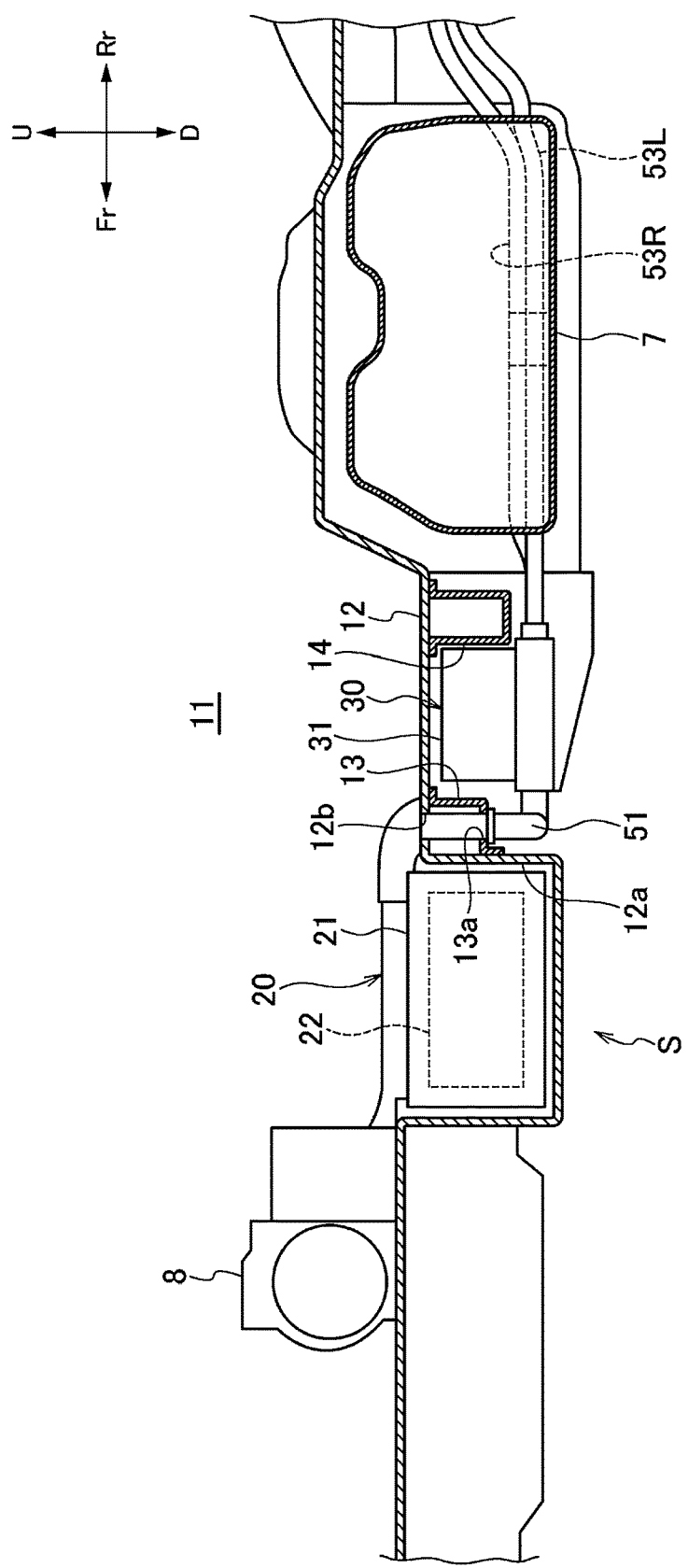
FIG. 2 is a schematic sectional view of a high-voltage-device arrangement section of the vehicle illustrated in FIG. 1, taken in a front-rear direction.
Figure 3:
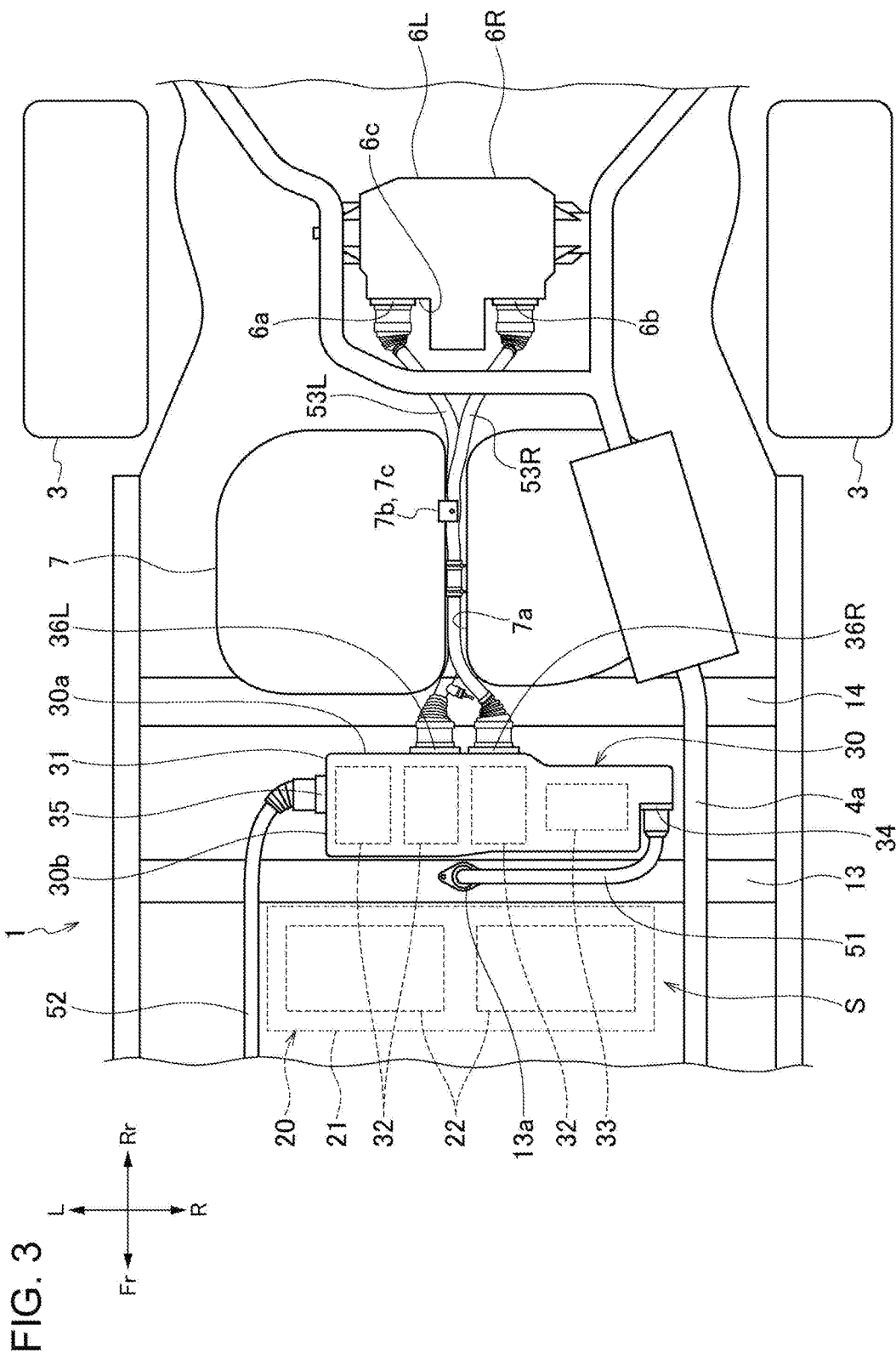
FIG. 3 is a bottom view of the high-voltage-device arrangement section, a fuel tank, and rear-wheel drive motors included in the vehicle illustrated in FIG. 1.

As shown in FIGS. 1 to 3, a vehicle 1 according to the present embodiment includes a structure for driving front wheels 2 and rear wheels 3. The structure includes an engine 4 and a front-wheel drive motor 5 for driving the front wheels 2; a left rear-wheel drive motor 6L for driving the left rear wheel 3; a right rear-wheel drive motor 6R for driving the right rear wheel 3; a battery unit 20 for supplying electric power to the motors 5, 6L, and 6R; a power conversion unit 30 that performs electric power conversion when the electric power of the battery unit 20 is supplied to the motors 5, 6L, and 6R; a fuel tank 7 that stores fuel for the engine 4; and an exhaust pipe 4a that guides the exhaust from the engine 4 to the rear of the vehicle 1. The engine 4 and the front-wheel drive motor 5 are disposed in an engine room located in a front section of the vehicle, and the rear-wheel drive motors 6L and 6R and the fuel tank 7 are disposed below a floor panel 12 in a rear section of the vehicle. The exhaust pipe 4a extends rearward from the engine 4 through a region on the right side of the fuel tank 7, and then branches into portions that extend further rearward through regions on the left and right sides of the rear-wheel drive motors 6L and 6R.

The battery unit 20 includes a housing 21 having a rectangular parallelepiped shape that extends in the left-right direction in plan view, a plurality of high-voltage batteries 22 that supply electric power to the motors 5, 6L, and 6R, and a cooling mechanism (not shown) that cools the high-voltage batteries 22. The high-voltage batteries 22 and the cooling mechanism are disposed in the housing 21.

The high-voltage batteries 22 are devices to be cooled having a low management temperature, and are easily affected by an outside air temperature (including a temperature increase due to the exhaust pipe 4a). The cooling mechanism for the battery unit 20 is an air-cooled cooling mechanism, which is suitable for cooling devices having a low management temperature, and cools the high-voltage batteries 22 by using the air in a vehicle cabin 11 (in the present embodiment, cold air ejected from an air-conditioning device 8 for conditioning the air in the vehicle cabin 11).

The power conversion unit 30 includes a housing 31 having a rectangular parallelepiped shape that extends in the left-right direction in plan view, a plurality of inverters 32 that perform electric power conversion when the electric power of the battery unit 20 is supplied to the motors 5, 6L, and 6R; a DC-DC converter 33 that performs voltage conversion to supply the electric power of the battery unit 20 to, for example, the air-conditioning device 8 and a low-voltage battery (not shown); and a cooling mechanism (not shown) for cooling the inverters 32 and the DC-DC converter 33. The inverters 32, the DC-DC converter 33, and the cooling mechanism are disposed in the housing 31.

The inverters 32 and the DC-DC converter 33 are devices to be cooled having a management temperature higher than that of the high-voltage batteries 22, and the influence thereon of the outside air temperature is small. The cooling mechanism for the power conversion unit 30 is a water-cooled cooling mechanism, which is suitable for cooling devices having a high management temperature, and cools the inverters 32 and the DC-DC converter 33 by using cooling water supplied from a radiator 9.

As shown in FIGS. 1 and 2, the battery unit 20 and the power conversion unit 30 are disposed in a high-voltage-device arrangement section S, which is provided in a central region of the vehicle 1. More specifically, the high-voltage-device arrangement section S is located between the front-wheel drive motor 5 and the rear-wheel drive motors 6L and 6R in the front-rear direction, and the battery unit 20 and the power conversion unit 30 are arranged next to each other in the front-rear direction in the high-voltage-device arrangement section S. The fuel tank 7 is disposed between the high-voltage-device arrangement section S and the rear-wheel drive motors 6L and 6R.

As shown in FIG. 2, the battery unit 20 is disposed in the vehicle cabin 11. More specifically, the battery unit 20 is disposed in a recess 12a formed in a side of the floor panel 12 that faces the vehicle cabin 11. The high-voltage batteries 22 included in the battery unit 20, which is disposed in the vehicle cabin 11, are cooled by cold air ejected from the air-conditioning device 8 for conditioning the air in the vehicle cabin 11.

The power conversion unit 30 is disposed outside the vehicle cabin 11. More specifically, the power conversion unit 30 is disposed behind the battery unit 20 and below the floor panel 12. The inverters 32 and the DC-DC converter 33 included in the power conversion unit 30, which is disposed outside the vehicle cabin 11, are cooled by the cooling water supplied from the radiator 9 through a region outside the vehicle cabin 11.

A center cross member 13 and a rear cross member 14, which reinforce the floor panel 12, are provided on a side of the floor panel 12 that is outside the vehicle cabin 11. Each of the center cross member 13 and the rear cross member 14 forms a closed cross section together with the floor panel 12, so that the floor panel 12 has sufficient rigidity. The center cross member 13 is located between the battery unit 20 and the power conversion unit 30, and the rear cross member 14 is located between the power conversion unit 30 and the fuel tank 7.

The battery unit 20 and the power conversion unit 30 are respectively disposed inside and outside the vehicle cabin 11 with the floor panel 12 disposed therebetween, and are arranged so as to overlap in the height direction. The top surfaces of the battery unit 20 and the power conversion unit 30 are at substantially the same height, and are lower than the top surface of the fuel tank 7, which is disposed in a rear section. Accordingly, although the battery unit 20 is disposed in the vehicle cabin 11, the battery unit 20 does not protrude into the vehicle cabin 11. The bottom surfaces of the battery unit 20 and the power conversion unit 30 are also at substantially the same height, and the height thereof is substantially the same as the height of the bottom surface of the fuel tank 7 disposed in the rear section. Accordingly, none of these components protrude downward.

Arrangement of Connectors of Power Conversion Unit

The arrangement of connectors of the power conversion unit 30 will now be described with reference to FIGS. 3 to 6.

As shown in FIGS. 3 to 6, all of the electrical connections between the power conversion unit 30 and other devices are provided by connectors. The connectors of the power conversion unit 30 include a direct-current cable connector 34, a front three-phase cable connector 35, rear three-phase cable connectors 36L and 36R, an air-conditioning cable connector 37, and a control harness connector 38.

The direct-current cable connector 34 is connected to the battery unit 20 by a direct-current cable 51, and inputs direct-current high-voltage electric power supplied from the battery unit 20 to the inverters 32 and the DC-DC converter 33. The housing 31 of the power conversion unit 30 includes a projecting portion 31a that projects rightward from a right side surface 30c thereof, and the direct-current cable connector 34 is provided on a front surface 30d of the projecting portion 31a. The direct-current cable 51, which is connected to the direct-current cable connector 34, extends parallel to the front surface of the power conversion unit 30 below the center cross member 13 after being bent the first time, and then extends through a through hole 13a in the center cross member 13 and a through hole 12b in the floor panel 12 and enters the vehicle cabin 11 after being bent the second time. Thus, the direct-current cable 51 is connected to the battery unit 20. The through hole 13a in the center cross member 13 and the through hole 12b in the floor panel 12 overlap in plan view.

The direct-current cable connector 34 according to present embodiment is integrated with a low-voltage output cable connector, which supplies low-voltage electric power converted by the DC-DC converter 33 to a low-voltage device, such as a low-voltage battery. More specifically, the direct-current cable 51 according to the present embodiment includes a high-voltage direct current line connected to the battery unit 20, and a low-voltage direct current line connected to the low-voltage device. Owing to the connection between the direct-current cable 51 and the direct-current cable connector 34, not only can the electric power from the battery unit 20 be input to the power conversion unit 30, the low-voltage electric power converted by the DC-DC converter 33 can be output to a low-voltage device, such as a low-voltage battery.

The front three-phase cable connector 35 is connected to the front-wheel drive motor 5 by a front three-phase cable 52, and supplies three-phase electric power converted by the inverters 32 to the front-wheel drive motor 5. The front three-phase cable connector 35 according to the present embodiment is provided on a left side surface 30b of the power conversion unit 30. The front three-phase cable 52, which is connected to the front three-phase cable connector 35, extends toward the front of the vehicle 1 at a side of the battery unit 20 after being bent the first time, extends parallel to the front surface of the battery unit 20 after being bent the second time, and is connected to the front-wheel drive motor 5 after being bent the third time.

The rear three-phase cable connectors 36L and 36R are respectively connected to the left and right rear-wheel drive motors 6L and 6R by a pair of rear three-phase cables 53L and 53R, and supply the three-phase electric power converted by the inverters 32 to the left and right rear-wheel drive motors 6L and 6R. The rear three-phase cable connectors 36L and 36R according to the present embodiment are arranged next to each other in the left-right direction on a rear surface 30a of the power conversion unit 30 in a central region of the rear surface 30a in the left-right direction. The rear three-phase cables 53L and 53R, which are connected to the rear three-phase cable connectors 36L and 36R, extend through a recess 7a in the fuel tank 7 to a rear section of the vehicle 1, and are respectively connected to the rear-wheel drive motors 6L and 6R.

The air-conditioning cable connector 37 is connected to the air-conditioning device 8 by an air-conditioning cable (not shown), and supplies the electric power subjected to voltage conversion performed by the DC-DC converter 33 to the air-conditioning device 8. The control harness connector 38 is connected to an ECU (not shown) by a control harness (not shown), and enables transmission of control signals between the ECU and the inverters 32. The air-conditioning cable connector 37 and the control harness connector 38 according to the present embodiment are arranged on the left side surface 30b of the power conversion unit 30 together with the front three-phase cable connector 35. Since the connectors 35, 37, and 38 are near each other, the arrangement of the cables can be facilitated.

Arrangement of Rear Three-Phase Cables

The arrangement of the pair of rear three-phase cables 53L and 53R will now be described with reference to FIG. 3.

As shown in FIG. 3, the power conversion unit 30 includes the left and right rear three-phase cable connectors 36L and 36R on the rear surface 30a that opposes the rear-wheel drive motors 6L and 6R, and the rear-wheel drive motors 6L and 6R include left and right rear three-phase cable connectors 6a and 6b on front surfaces 6c thereof that oppose the power conversion unit 30. The pair of rear three-phase cables 53L and 53R, which connect the rear three-phase cable connectors 36L and 36R of the power conversion unit 30 to the rear three-phase cable connectors 6a and 6b of the rear-wheel drive motors 6L and 6R, overlap the fuel tank 7, which is disposed between the power conversion unit 30 and the rear-wheel drive motors 6L and 6R, in bottom view.

The recess 7a, which is recessed upward, is formed in the bottom surface of the fuel tank 7 so as to extend in the front-rear direction. Intermediate portions of the pair of rear three-phase cables 53L and 53R are disposed in the recess 7a in the fuel tank 7, thereby being linearly arranged and protected by the fuel tank 7. In the present embodiment, the recess 7a is disposed in a central region of the fuel tank 7 in the vehicle width direction to reduce the impact of a side collision on the rear three-phase cables 53L and 53R.

The intermediate portions of the pair of rear three-phase cables 53L and 53R are arranged in the height direction in the recess 7a, and are retained by a bracket 7b provided in the recess 7a. The bracket 7b includes a cable retaining portion 7c that retains the pair of rear three-phase cables 53L and 53R from below (at the bottom). Even when the rear three-phase cables 53L and 53R approach the ground, the cable retaining portion 7c comes into contact with the ground first, so that the risk of damage to the rear three-phase cables 53L and 53R can be reduced.

The left and right rear three-phase cable connectors 36L and 36R provided on the power conversion unit 30 and the left and right rear three-phase cable connectors 6a and 6b provided on the rear-wheel drive motors 6L and 6R are laterally symmetrical about the recess 7a in a direction perpendicular to the vehicle width direction. Accordingly, the pair of rear three-phase cables 53L and 53R may have the same structure.

Rear Three-Phase Cable Structure

The structure of the rear three-phase cables 53L and 53R will now be described with reference to FIGS. 7 and 8.

Figure 7:
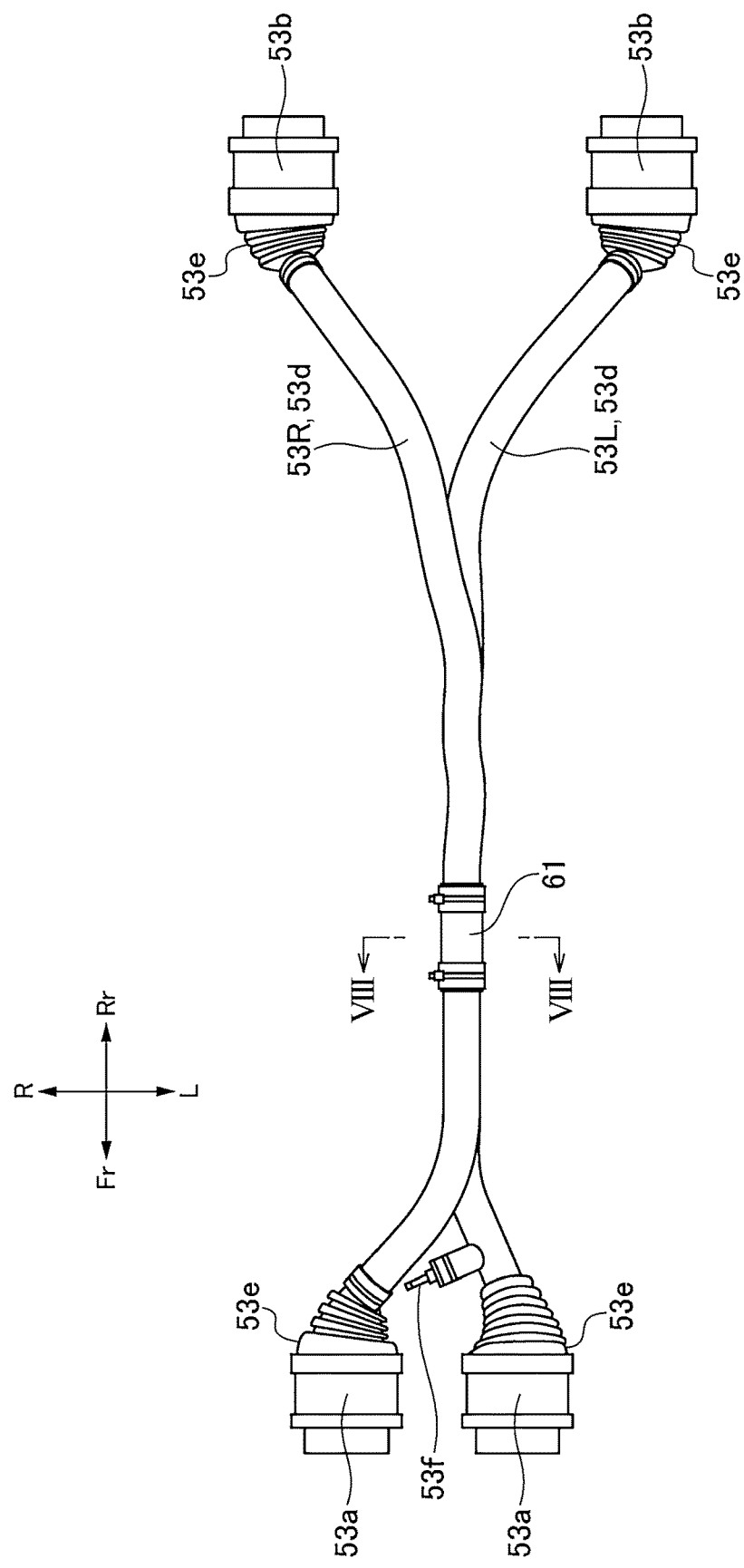
FIG. 7 is a plan view of rear three-phase cables according to the embodiment of the present disclosure.
Figure 8:
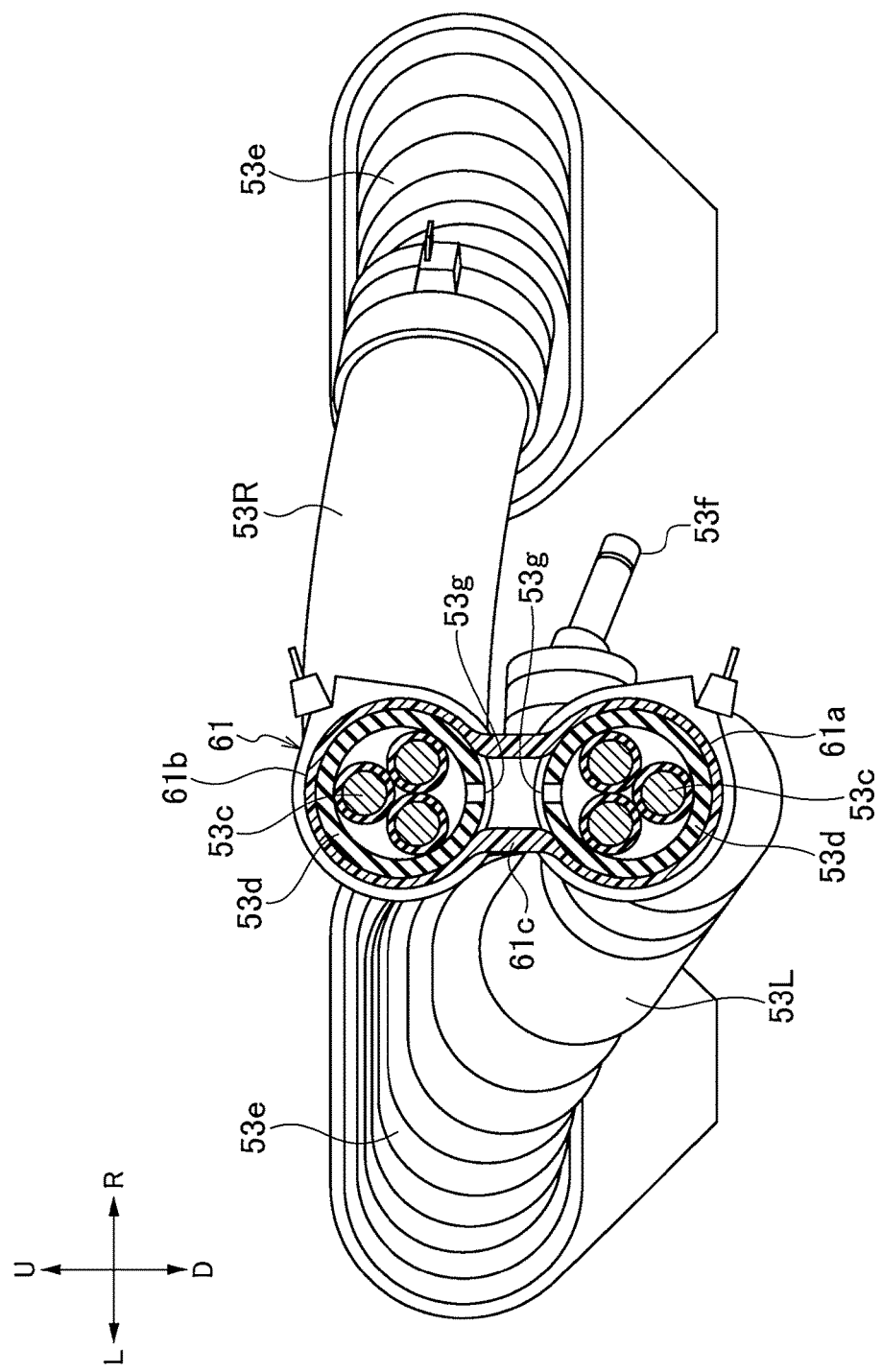
FIG. 8 is a sectional view taken along line VIII-VIII in FIG. 7.

As shown in FIGS. 7 and 8, the rear three-phase cables 53L and 53R are connector cables having a waterproof function. Each of the rear three-phase cables 53L and 53R includes a power-conversion connector 53a connected to the corresponding one of the rear three-phase cable connectors 36L and 36R of the power conversion unit 30; a motor connector 53b connected to the corresponding one of the rear three-phase cable connectors 6a and 6b of the rear-wheel drive motors 6L and 6R; a three-phase line 53c that electrically connects the power-conversion connector 53a to the motor connector 53b; a corrugated tube 53d that covers the three-phase line 53c; and sealing grommets 53e that airtightly connect the connectors 53a and 53b to the corrugated tube 53d.

The rear three-phase cables 53L and 53R having the above-described waterproof function are each required to enable ventilation of the space inside the corrugated tube 53d to reduce the risk that the corrugated tube 53d and the sealing grommets 53e will be damaged due to expansion and compression of the air in the corrugated tube 53d caused by a change in environmental temperature or self-heating. For example, a ventilation-tube connecting portion 53f is provided on the corrugated tube 53d, so that the space inside the corrugated tube 53*d* can be ventilated through the ventilation-tube connecting portion 53*f*.

In the present embodiment, the ventilation structures for enabling ventilation of the pair of rear three-phase cables 53L and 53R are integrated together to simplify the structure. More specifically, the space inside the corrugated tube 53*d* of the rear three-phase cable 53L and the space inside the corrugated tube 53*d* of the rear three-phase cable 53R are configured to communicate with each other, and the ventilation-tube connecting portion 53*f* is provided on the corrugated tube 53*d* of the rear three-phase cable 53L, so that the spaces inside the corrugated tubes 53*d* of the rear three-phase cables 53L and 53R can both be ventilated through the ventilation-tube connecting portion 53*f*.

In the present embodiment, a connecting grommet 61, which retains the corrugated tubes 53*d* of the pair of rear three-phase cables 53L and 53R in a connected state, is used to enable the spaces inside the corrugated tubes 53*d* of the pair of rear three-phase cables 53L and 53R to communicate with each other. The connecting grommet 61 includes a first retaining portion 61*a* that is airtightly fitted around the corrugated tube 53*d* of the rear three-phase cable 53L, a second retaining portion 61*b* that is airtightly fitted around the corrugated tube 53*d* of the rear three-phase cable 53R, and a communicating portion 61*c* that connects the first retaining portion 61*a* and the second retaining portion 61*b* to each other and enables the inside of the first retaining portion 61*a* and the inside of the second retaining portion 61*b* to communicate with each other. The corrugated tubes 53*d* of the pair of rear three-phase cables 53L and 53R have communication holes 53*g* through which the spaces inside the corrugated tubes 53*d* communicate with the communicating portion 61*c* of the connecting grommet 61. Thus, the spaces inside the corrugated tubes 53*d* of the pair of rear three-phase cables 53L and 53R communicate with each other through the connecting grommet 61.

Ventilation Structure of Power Conversion Unit

The ventilation structure of the power conversion unit 30 will now be described with reference to FIG. 4.

Figure 4:
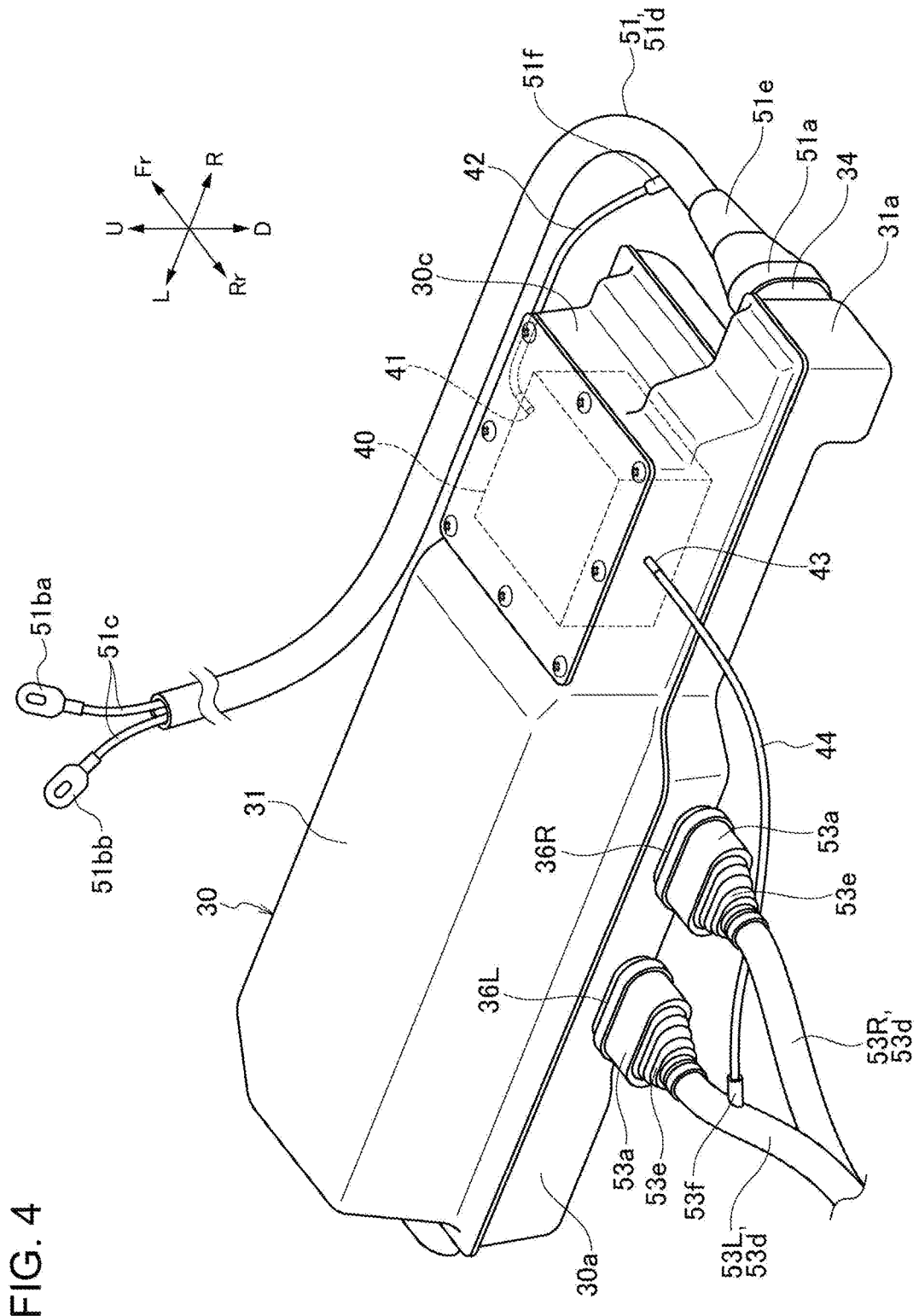
FIG. 4 is a perspective view illustrating the state in which cables are connected to a power conversion unit according to the embodiment of the present disclosure.
Figure 5:
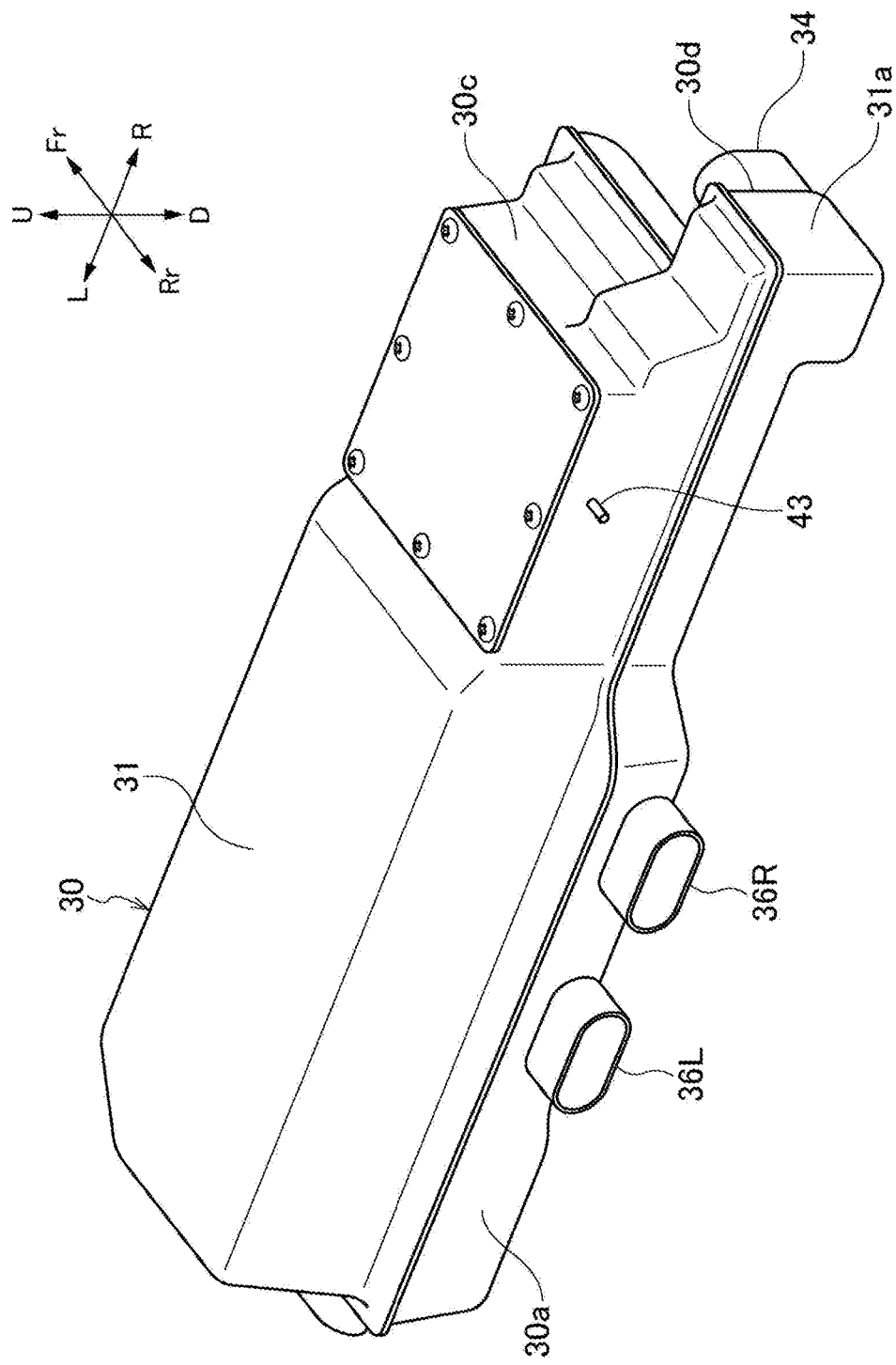
FIG. 5 is a perspective view of the power conversion unit according to the embodiment of the present disclosure.
Figure 6:
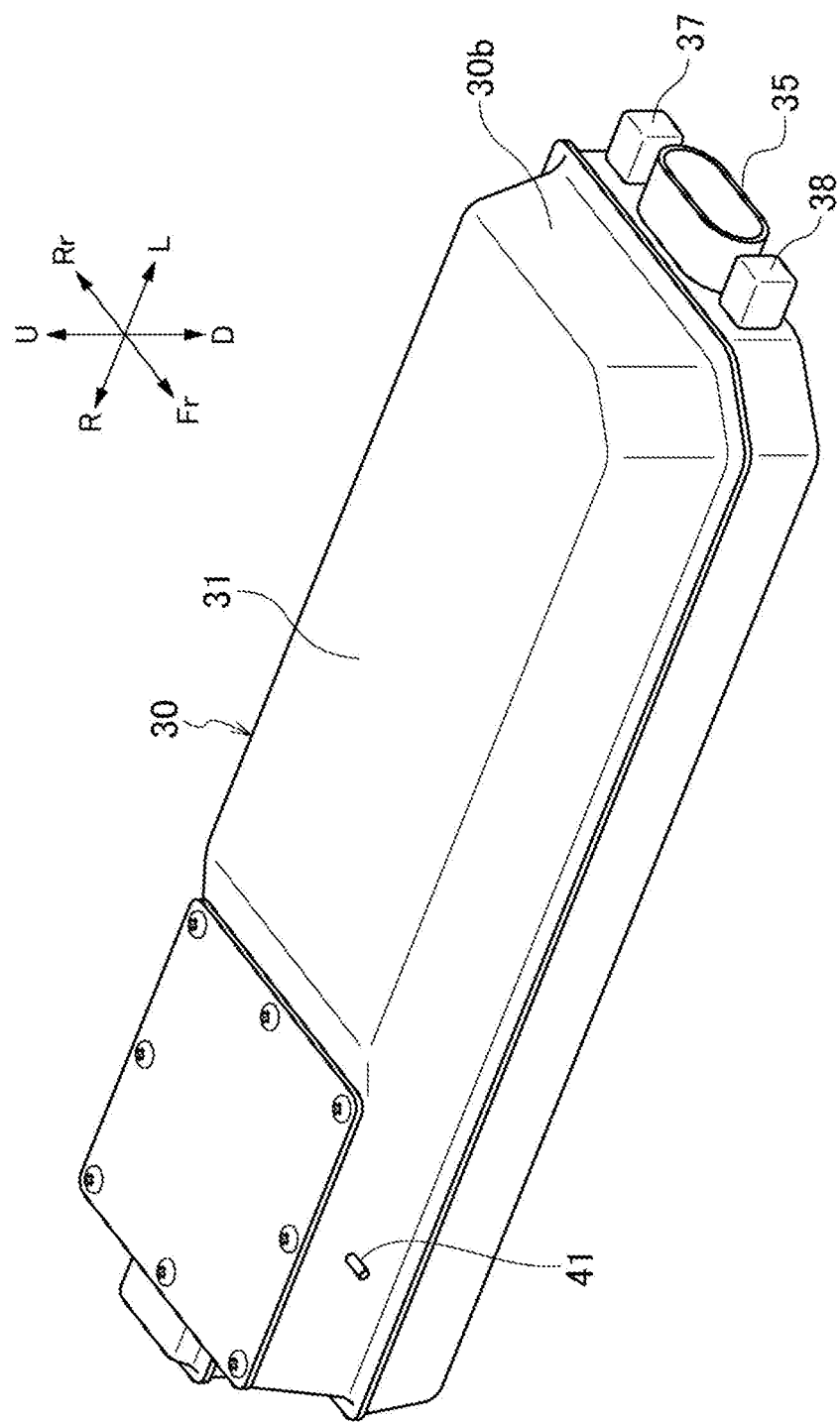
FIG. 6 is a perspective view of the power conversion unit according to the embodiment of the present disclosure viewed in another direction.

As shown in FIG. 4, the power conversion unit 30 includes a breather chamber 40 that enables ventilation of an electronic-device accommodation space provided in the power conversion unit 30. The breather chamber 40 communicates with the electronic-device accommodation space in the power conversion unit 30 through a vent plug (not shown), and also communicates with the space outside the power conversion unit 30 through a ventilation nozzle 41.

In the present embodiment, the direct-current cable 51, which extends inside and outside the vehicle cabin 11, is used to enable the breather chamber 40 to communicate with the space inside the vehicle cabin 11. The direct-current cable 51 includes a power-conversion connector 51*a* connected to the direct-current cable connector 34 of the power conversion unit 30; a battery terminal 51*ba* connected to the battery unit 20; a low-voltage-device terminal 51*bb* connected to the low-voltage device; direct current lines 51*c* that electrically connect the power-conversion connector 51*a* to the battery terminal 51*ba* and to the low-voltage-device terminal 51*bb*; a corrugated tube 51*d* that covers the direct current lines 51*c*; a sealing grommet 51*e* that airtightly connects the power-conversion connector 51*a* to the corrugated tube 51*d*; and a ventilation-tube connecting portion 51*f* that is disposed near the power-conversion connector 51*a* and that communicates with the space inside the corrugated tube 51*d*. The ventilation-tube connecting portion 51*f* is connected to the ventilation nozzle 41 of the breather chamber 40 by a ventilation tube 42. Accordingly, the breather chamber 40 communicates with the space inside the vehicle cabin 11 through the spaces inside the ventilation tube 42 and the direct-current cable 51.

In the present embodiment, the breather chamber 40 of the power conversion unit 30 is used to enable ventilation of the spaces inside the corrugated tubes 53*d* of the rear three-phase cables 53L and 53R. More specifically, the ventilation-tube connecting portion 53*f* of the rear three-phase cables 53L and 53R is connected to an auxiliary ventilation nozzle 43 provided on the breather chamber 40 by a ventilation tube 44, so that the spaces inside the corrugated tubes 53*d* of the rear three-phase cables 53L and 53R communicate with the space inside the vehicle cabin 11 through the spaces inside the breather chamber 40, the ventilation tube 42, and the direct-current cable 51.

As described above, in the vehicle 1 according to the present embodiment, the power conversion unit 30 is disposed between the front-wheel drive motor 5 and the rear-wheel drive motors 6L and 6R in the front-rear direction. Therefore, the lengths of the three-phase cables 52, 53L, and 53R, which extend from the power conversion unit 30 to the front-wheel drive motor 5 and the rear-wheel drive motors 6L and 6R, can be reduced.

In addition, the power conversion unit 30 is provided with the rear three-phase cable connectors 36L and 36R on the rear surface 30*a* and the front three-phase cable connector 35 on the left side surface 30*b*. The rear three-phase cable connectors 36L and 36R are connected to the rear three-phase cables 53L and 53R that electrically connect the rear-wheel drive motors 6L and 6R to the power conversion unit 30. The front three-phase cable connector 35 is connected to the front three-phase cable 52 that electrically connects the front-wheel drive motor 5 to the power conversion unit 30. Accordingly, a space for arranging other devices can be provided in a region that is long in the left-right direction in front of the power conversion unit 30.

The battery unit 20 is disposed in the region that is long in the left-right direction in front of the power conversion unit 30. Thus, the battery unit 20 and the power conversion unit 30 are arranged next to each other in the front-rear direction. Accordingly, impact protection can be integrated at a single location, so that the vehicle structure is simpler than in the case where the battery unit 20 and the power conversion unit 30 are apart from each other. In addition, the length of the direct-current cable 51 that connects the battery unit 20 to the power conversion unit 30 can be minimized.

Since the control harness connector 38 is provided on the left side surface 30*b* of the power conversion unit 30 in addition to the front three-phase cable connector 35, the front three-phase cable connector 35 and the control harness connector 38 can be disposed near each other and the arrangement of the lines can be facilitated.

In addition, since the direct-current cable connector 34 is disposed at a location different from the locations of the front three-phase cable connector 35 and the rear three-phase cable connectors 36L and 36R, improper assembly can be prevented.

In addition, since an output-cable connector portion, which is connected to the low-voltage device, is integrated with the direct-current cable connector 34, the arrangement of the lines can be further facilitated.

The present disclosure is not limited to the above-described embodiment, and modifications, improvements, etc., may be made as appropriate.

For example, the front three-phase cable connector 35 connected to the front three-phase cable 52, which electrically connects the front-wheel drive motor 5 to the power conversion unit 30, may be provided on the front surface of the power conversion unit 30, and the rear three-phase cable connectors 36L and 36R connected to the rear three-phase cables 53L and 53R, which electrically connect the rear-wheel drive motors 6L and 6R to the power conversion unit 30, may be provided on the left side surface 30b or the right side surface 30c of the power conversion unit 30. The number of rear-wheel drive motors 6L and 6R may instead be one.

According to an aspect of the present disclosure, a vehicle (for example, vehicle 1) includes a first motor (for example, rear-wheel drive motors 6L and 6R) and a second motor (for example, front-wheel drive motor 5) that are apart from each other in a front-rear direction; a high-voltage device (for example, battery unit 20 or high-voltage batteries 22) that supplies electric power to the first motor and the second motor; and a power converter (for example, power conversion unit 30 or inverters 32) that performs electric power conversion when the electric power of the high-voltage device is supplied to the first motor and the second motor. The power converter is disposed between the first motor and the second motor in the front-rear direction. The power converter has a rectangular parallelepiped shape that extends in a left-right direction. The power converter is provided with a first connector portion (for example, rear three-phase cable connectors 36L and 36R) on a side surface (for example, rear surface 30a) at one side in the front-rear direction and a second connector portion (for example, front three-phase cable connector 35) on a side surface (for example, left side surface 30b) at one side in the left-right direction. The first connector portion is connected to a three-phase line (for example, rear three-phase cables 53L and 53R) that electrically connects the first motor to the power converter. The second connector portion is connected to a three-phase line (for example, front three-phase cable 52) that electrically connects the second motor to the power converter.

According to the above-described aspect of the present disclosure, the power converter is disposed between the first motor and the second motor in the front-rear direction. Therefore, the lengths of the three-phase lines that extend from the power converter to the first motor and the second motor can be reduced. The power converter is provided with the first connector portion, which is connected to the three-phase line that electrically connects the first motor to the power converter, on the side surface at one side in the front-rear direction, and the second connector portion, which is connected to the three-phase line that electrically connects the second motor to the power converter, on the side surface at one side in the left-right direction. Accordingly, a space for arranging other devices can be provided in a region that is long in the left-right direction at the other side in the front-rear direction.

In the vehicle, the power converter may be provided with a control harness connector portion (for example, control harness connector 38) on the side surface at the one side in the left-right direction, the control harness connector portion being connected to a control harness that electrically connects a power-converter control device to the power converter.

In this case, since the second connector portion and the control harness connector portion are disposed near each other on the side surface of the power converter at the one side in the left-right direction, the arrangement of the lines can be facilitated.

In the vehicle, the high-voltage device may be disposed adjacent to the power converter at the other side of the power converter in the front-rear direction.

In this case, the high-voltage device can be arranged in the space provided in the region that is long in the left-right direction at the other side in the front-rear direction. Thus, the high-voltage device and the power converter can be arranged next to each other in the front-rear direction, and impact protection therefor can be integrated at a single location. Therefore, the vehicle structure is simpler than in the case where the high-voltage device and the power converter are apart from each other. In addition, the length of the high-voltage line that connects the high-voltage device to the power converter can be minimized.

In the vehicle, the power converter may be provided with a projecting portion (for example, projecting portion 31a) on a side surface (for example, right side surface 30c) at the other side in the left-right direction, the projecting portion projecting toward the other side. A high-voltage-line connector portion (for example, direct-current cable connector 34) may be provided on a side surface (for example, front surface 30d) of the projecting portion at the other side in the front-rear direction, the high-voltage-line connector portion being connected to a high-voltage line (for example, direct-current cable 51) that is connected to the high-voltage device.

In this case, since the high-voltage-line connector portion is disposed at a location different from the locations of the first connector portion and the second connector portion, improper assembly can be prevented.

In the vehicle, the high-voltage-line connector portion may be integrated with an output-cable connector portion connected to a low-voltage device.

In this case, since the output-cable connector portion, which is connected to the low-voltage device, is integrated with the high-voltage-line connector portion, the arrangement of the lines can be further facilitated.

Obviously, numerous modifications and variations of the present invention are possible in light of the above teachings. It is therefore to be understood that within the scope of the appended claims, the invention may be practiced otherwise than as specifically described herein.

What is claimed is:

1. A vehicle comprising:
a first motor and a second motor that are apart from each other in a front-rear direction;
a high-voltage device that supplies electric power to the first motor and the second motor; and
a power converter that performs electric power conversion when the electric power of the high-voltage device is supplied to the first motor and the second motor,
wherein the power converter is disposed between the first motor and the second motor in the front-rear direction,
wherein the power converter has a rectangular parallelepiped shape that extends in a left-right direction perpendicular to the front-rear direction, and
wherein the power converter is provided with a first connector portion on an exterior side surface at one side in the front-rear direction and a second connector portion on an exterior side surface at one side in the left-right direction, the first connector portion being connected to a three-phase line that electrically connects the first motor to the power converter, the second connector portion being connected to a three-phase line that electrically connects the second motor to the power converter.

2. The vehicle according to claim 1, wherein the power converter is provided with a control harness connector portion on the side surface at the one side in the left-right direction, the control harness connector portion being connected to a control harness that electrically connects a power-converter control device to the power converter.

3. The vehicle according to claim 1, wherein the high-voltage device is disposed adjacent to the power converter at the other side of the power converter in the front-rear direction.

4. The vehicle according to claim 1,
wherein the first connector portion extends from the exterior side surface at the one side in the front-rear direction, and the second connector portion extends from the exterior side surface at one side in the left-right direction.

5. The vehicle according to claim 1,
wherein the exterior side surface at the one side in the front-rear direction and the exterior side surface at the one side in the left-right direction are exterior side surfaces of a housing of the power converter that has the rectangular parallelepiped shape.

6. The vehicle according to claim 1, further comprising:
a fuel tank having a recess,
wherein the three-phase line that electrically connects the first motor to the power converter includes a portion disposed within the recess.

7. The vehicle according to claim 1,
wherein the power converter includes a plurality of inverters disposed adjacent to each other in the left-right direction.

8. The vehicle according to claim 1,
wherein the high-voltage device is disposed between the second motor and the power converter in the front-rear direction.

9. A vehicle according to claim 3, comprising:
a first motor and a second motor that are apart from each other in a front-rear direction;
a high-voltage device that supplies electric power to the first motor and the second motor; and
a power converter that performs electric power conversion when the electric power of the high-voltage device is supplied to the first motor and the second motor,
wherein the power converter is disposed between the first motor and the second motor in the front-rear direction,
wherein the power converter has a rectangular parallelepiped shape that extends in a left-right direction,
wherein the power converter is provided with a first connector portion on a side surface at one side in the front-rear direction and a second connector portion on a side surface at one side in the left-right direction, the first connector portion being connected to a three-phase line that electrically connects the first motor to the power converter, the second connector portion being connected to a three-phase line that electrically connects the second motor to the power converter,
wherein the high-voltage device is disposed adjacent to the power converter at the other side of the power converter in the front-rear direction,
wherein the power converter is provided with a projecting portion on a side surface at the other side in the left-right direction, the projecting portion projecting toward the other side, and
wherein a high-voltage-line connector portion is provided on a side surface of the projecting portion at the other side in the front-rear direction, the high-voltage-line connector portion being connected to a high-voltage line that is connected to the high-voltage device.

10. The vehicle according to claim 9, wherein the high-voltage-line connector portion is integrated with an output-cable connector portion connected to a low-voltage device.

11. A vehicle comprising:
a first motor and a second motor arranged along a front-rear direction of the vehicle, the front-rear direction being perpendicular to a height direction of the vehicle;
a high-voltage device to supply electric power; and
a power converter disposed between the first motor and the second motor in the front-rear direction and connected to the high-voltage device, the first motor, and the second motor, the power converter being configured to convert the electric power supplied from the high-voltage device and to supply the converted electric power to the first motor and the second motor, the power converter having a substantially rectangular parallelepiped shape that has a longest side along a width direction of the vehicle perpendicular to the front-rear direction and to the height direction and that has a first side wall, a second side wall opposite to the first side wall in the front-rear direction, a third side wall, and a fourth side wall opposite to the third side wall in the width direction, the power converter comprising:
a first connector provided on the first side wall and connected to a first three-phase line via which the first motor is electrically connected to the power converter; and
a second connector provided on the third side wall and connected to a second three-phase line via which the second motor is electrically connected to the power converter.

12. The vehicle according to claim 11, wherein the power converter is provided with a control harness connector portion on the third side wall, the control harness connector portion being connected to a control harness that electrically connects a power-converter control device to the power converter.

13. The vehicle according to claim 11, wherein the high-voltage device is disposed adjacent to the power converter so as to face the second side wall in the front-rear direction.

14. The vehicle according to claim 13,
wherein the power converter is provided with a projecting portion on the fourth side wall, and
wherein a high-voltage-line connector portion is provided on a side surface of the projecting portion opposite to the first side wall in the front-rear direction, the high-voltage-line connector portion being connected to a high-voltage line that is connected to the high-voltage device.

15. The vehicle according to claim 14, wherein the high-voltage-line connector portion is integrated with an output-cable connector portion connected to a low-voltage device.

* * * * *